United States Patent [19]

Ahuja

[11] Patent Number: 5,752,185
[45] Date of Patent: May 12, 1998

[54] DISCONNECTION MANAGEMENT SYSTEM FOR WIRELESS VOICE COMMUNICATIONS

[75] Inventor: Sudhir Raman Ahuja, Aberdeen, N.J.

[73] Assignee: Lucent Technologies Inc., Murray Hill, N.J.

[21] Appl. No.: 342,496

[22] Filed: Nov. 21, 1994

[51] Int. Cl.[6] .................................................. H04Q 7/38
[52] U.S. Cl. ........................ 455/414; 455/564; 455/459
[58] Field of Search ................................ 379/58, 59, 60, 379/61, 62, 63, 112, 114, 115; 455/33.1, 33.2, 54.1, 54.2, 405, 406, 408, 414, 458, 459, 460, 564

[56] References Cited

U.S. PATENT DOCUMENTS

| | | |
|---|---|---|
| 5,307,399 | 4/1994 | Dai et al. ................................. 379/57 |
| 5,371,783 | 12/1994 | Rose et al. ............................... 379/61 |
| 5,544,224 | 8/1996 | Jonsson et al. ........................... 379/58 |
| 5,566,236 | 10/1996 | McLampy et al. ..................... 379/58 X |

*Primary Examiner*—Dwayne Bost
*Assistant Examiner*—William G. Trost

[57] ABSTRACT

A communications system is designed to monitor voice communications signals for an initial end-to-end communications link which is comprised of a) a wireless segment which connects a wireless network to a wireless end-user apparatus, and b) a second segment which connects a communications end-user device to the wireless network. When the system detects that the wireless segment is inoperative, it inhibits the release of the second segment. Thereafter, the system sets up a subsequent wireless segment which extends from the wireless network to the wireless end-user apparatus. The subsequent wireless segment is then bridged to the second segment to form a new end-to-end communications link to restore connectivity between the wireless end-user apparatus and the communications end-user device.

23 Claims, 3 Drawing Sheets

DISCONNECTION MANAGEMENT SYSTEM FOR WIRELESS VOICE COMMUNICATIONS

TECHNICAL FIELD

This invention relates to communication systems. More specifically, this invention relates to a system to support wireless voice communication services.

BACKGROUND OF THE INVENTION

Radio Frequency (RF) signals for wireless communications are propagated in the free space environment and, as such, are often subject to high level of interferences caused by man-made or natural structural barriers which impair the propagation of those RF signals. As a result, users of wireless telephone sets occasionally experience abrupt and involuntary termination of their calls in the midst of sometimes important business or personal conversation with other parties.

The disconnection problem is further compounded when both parties, in their "simultaneous" attempt to establish a new connection for resuming their conversation, cause the access switches to relay busy tone signals to both telephone sets, thereby defeating the re-connection attempts. Furthermore, because the conversation was abruptly interrupted without warning or notification to either party, one or both parties, unaware of the disconnection problem, may continue talking to "deaf ears". As a result, some misunderstandings may occur when the parties are able to resume their conversation. Thus, a problem of the prior art is lack of a mechanism to notify the parties of the loss of carrier signal condition in the wireless section of a communications link. Another problem of the prior art is the absence of a system capable of automatically attempting to restore the wireless section of the link to reestablish the end-to-end connection when the loss of carrier on the wireless section of the link is of short duration.

SUMMARY OF THE INVENTION

The present invention is directed to a system that a) detects an inoperative condition of a wireless segment of a communications link which connects a wireless end-user apparatus and an end-user communications device, b) inhibits the release of a non-wireless segment of the communications link c) restores the wireless segment of the link, and d) reestablishes a connection between the wireless end-user apparatus and the end-user communications device using the non-wireless segment of the communications link and the restored wireless segment of the link as part of that connection.

In an embodiment of the invention, an initial communications link is established between a wireless end-user apparatus and an end-user communications device. The communications link includes a first segment for carrying wireless communications signals between a wireless network and the wireless end-user apparatus, and a second segment for connecting the wireless network to the end-user communications device. The wireless network comprises a cell site among a number of such cell sites, which monitors continuity signals received from the wireless end-user apparatus.

Upon detecting a loss of the continuity signals (e.g., a carrier signal, the wireless network transmits notification and instruction information to the end-user communications device via the remaining operative segment (i. e. second segment of the communications link. The notification information alerts the end-user communications device of the loss of carrier signal condition on the wireless segment while the instruction information inhibits the release of the second segment of the link by urging the user of the end-user communications device to refrain from taking any action that may disable that link. Thereafter, the wireless network proceeds to establish a new wireless first segment to the wireless end-user apparatus. Once the new first segment is established, the wireless network bridges the first segment to the second segment, thereby re-establishing an end-to-end connection between the wireless end-user apparatus and the end-user communications device.

DETAILED DESCRIPTION

Figure 1:
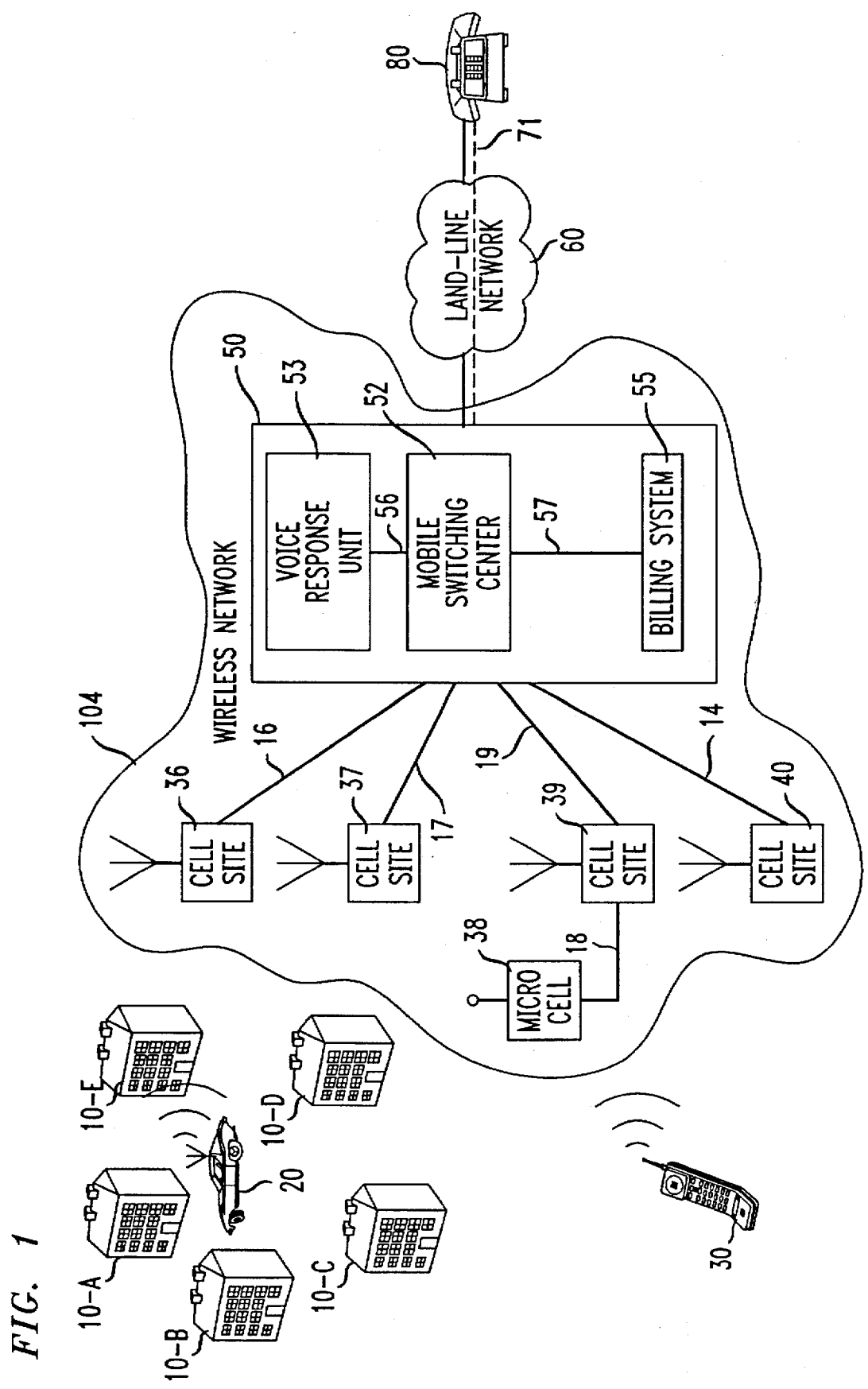
FIG. 1 is a block diagram of a communications system comprised of a wireless network arranged to facilitate communications between wireless end-user devices and other end-user communications devices in accordance with the invention.
Figure 2:
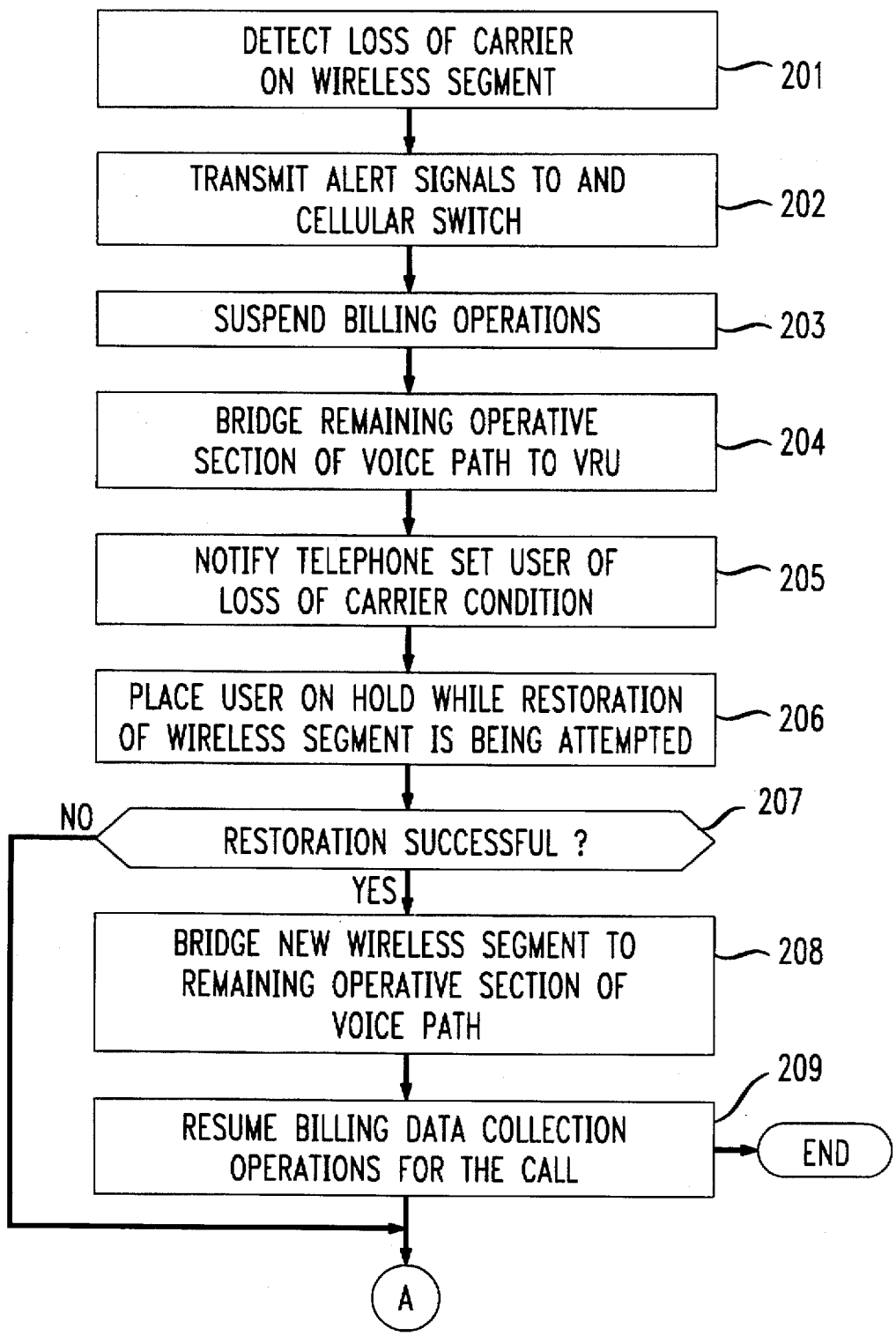
FIGS. 2 and 3 show, in flow diagram format, call processing instructions executed by different elements of the wireless network of FIG. 1 to provide communications services in accordance with the invention.
Figure 3:
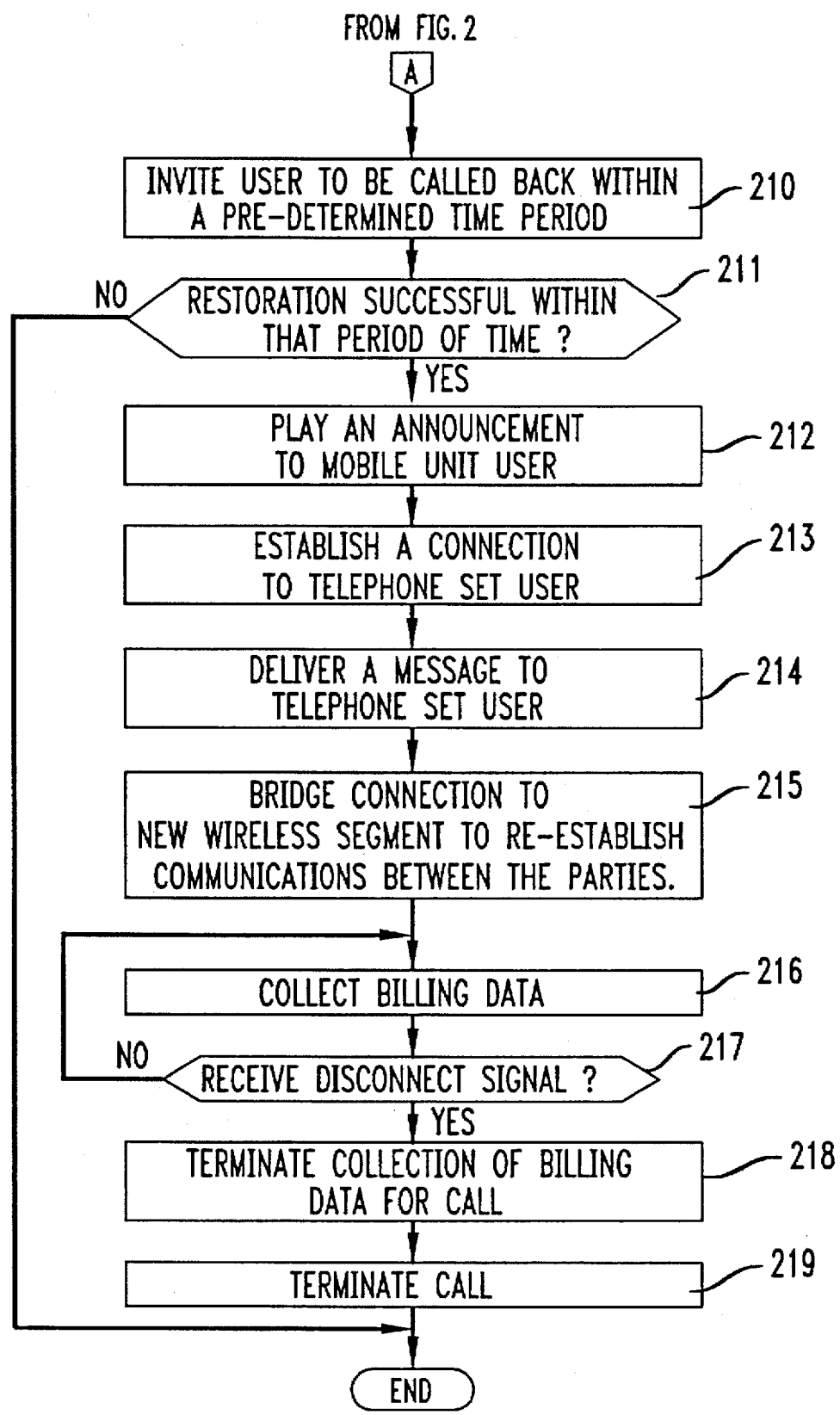

Shown in the block diagram of FIG. 1 is a wired telephone set 80 connected to a land-line network 60 that is comprised of interconnected local, tandem and toll switches (not shown) that enable a telephone call to be completed to a wired telephone set or to be forwarded to wireless network 104. Also shown on FIG. 1 are two wireless telephone sets, namely mobile telephone set 30 and carphone 20 that are arranged to communicate either with each other via wireless network 104, or with telephone set 80 via wireless network 104 and land-line network 60. Reflections from natural and man-made objects, such as buildings 10-A, 10-B, 10-C and 10-D, around the main communication paths of wireless telephones sets 20 and 30 cause multipath interferences that impair the propagation of signals relayed over those communication paths. Mobile telephone set 30 may be a low-mobility portable communications device which accesses wireless network 104 via, for example, RF signals received by microcell 38. Wireless telephone sets 20 and 30 tune to the channels of wireless network 104 to receive and transmit radio signals over the free-space environment via the nearest cell site of network 104.

Wireless network 104 may be an analog communications system using, for example, the Advanced Mobile Phone Service (AMPS) analog cellular radio standard. A detailed description of an AMPS-based communications system is provided in *Bell System Technical Journal*, Vol. 58, No. 1, January 1979, pp. 1–14. Alternatively, wireless network 104 may be a digital communications system implementing well-known code division multiple access (CDMA) or time-division multiple access (TDMA) techniques. Further information on TDMA and CDMA access techniques can be found in *AT&T Technical Journal*, Vol. 72, No. 4, July/August 1993, pp. 19–26.

Also shown in FIG. 1 are cell sites 36, 37, 39, 40 and microcell 38. Those cell sites perform call setup functions for calls destined for wireless telephone sets 20 and 30 by radiating RF signals to page and locate these devices using special radio channels called "forward control channels", constantly monitored by wireless telephone sets 20 and 30. When one of the cell sites 36, 37, 39 and 40 receives call setup signals for calls originated from wireless telephone set 20 or 30, the cell site performs the initial channel assignment and supervises the establishment of the wireless connection. The cell site also tears down a connection at the end of a call.

Of particular significance is the function of each of the cell sites 36, 37, 38, 39 and 40 to monitor supervisory signals transmitted over an established wireless channel to act as a continuity check on that channel. When wireless network 104 is an analog communications system, the supervisory signals are non-audible continuous supervisory audio tones (SAT). In that case, a transceiver (TX/RX) 360 (shown only in cell site 36, even though included in the other cell sites), superimposes the frequency of the SAT signals over a wireless voice channel established between carphone 20, for example, and cell site 36. A receiver (not shown) in carphone 20 detects the SAT signals and retransmits them back to cell site 36. Reception of the retransmitted SAT signals by TX/RX 360 is an indication that the wireless communications link from cell site 36 to carphone 20 is operative. Conversely, failure of reception of the retransmitted SAT signals by TX/RX 360 indicates that the wireless link between cell site 36 and carphone 20 is inoperative.

When wireless network 104 is a digital communications system, a digital signaling technique called "blank and burst" is used to monitor continuity of signals on a wireless link established, for example, between carphone 20 and cell site 36. Using that technique, a burst of digital information is transmitted from TX/RX 360 to carphone 20 which, in turn, retransmits an acknowledgement message to TX/RX 360. Because the transmission and reception of the digital information last only a fraction of a second, the communicating parties using the wireless link are not aware that their conversation has been interrupted. When cell site 36 detects loss of carrier on a wireless link, it immediately sends a signal to cellular switch 50 via facility 16.

Voice signals received by cell sites 36, 37, 39 and 40 are transmitted to cellular switch 50 via facilities 16, 17, 19 and 14, respectively. Cellular switch 50 is comprised of a set of modular hardware and software components. Cellular switch 50 administers radio channels allocated within the cellular network 104 and coordinates paging of wireless telephone sets 20 and 30 for calls destined for those sets. Cellular switch 50 also coordinates hand-off of calls (in progress) from one cell site to another, as wireless telephone sets 20 and 30 leave the boundaries of one cell site to cross the boundaries of another cell site. Although cellular switch 50 is shown in FIG. 1 as being remote from cell sites 36, 37, 39 and 40, it is to be understood that cellular switch 50 may be located within a cell site.

Of particular importance among the hardware components of cellular switch 50 is Mobile Switching Center (MSC) 52 which is a processor-controlled software-driven switching system arranged to provide seamless communications paths for calls routed over the wireless network 104. Specifically, for a call that is initiated from wired telephone set 80 and that is directed to wireless telephone set 20 or 30, MSC 52 receives the call from an incoming channel of land-line network 60 and selects the radio channel over wireless network 104 by sending a data message to the appropriate cell site to instruct wireless telephone set 20 or 30 to tune to the selected radio channel. Similarly, for a call originated from wireless telephone set 20 or 30, and destined for wired telephone set 80, MSC 52 bridges a radio channel and a selected outgoing channel that is established over land-line communications network 60. MSC 52 also authenticates (optionally, in an adjunct processor not shown) subscriber's identification information that is typically received from cellular telephone set 20 or 30, as part of a setup message. MSC 52 also terminates the signaling links of a signaling network (not shown) that is used to exchange call handling messages from land-line network 60 to wireless network 104, according to a specific protocol, such as the well-known Signaling System 7 (SS7).

In addition to the functions described earlier, MSC 52 also provides an interface to the support systems for Operations, Administration and Maintenance (OA&M) functions. In particular, when MSC 52 receives from a cell site a signal indicative of loss of carrier condition on an active wireless link, MSC 52 relays signaling information to billing system 55 to stop the billing data collection process.

Billing system 55 includes a processor that executes programmed instructions to record Minutes Of Usage (MOU) of wireless network 104 by wireless telephone set 20 or 30. The processor of billing system 55 includes a clock which is used to start and end a timer measuring MOU of network 104, upon receiving appropriate signals. The timer is started when MSC 52 transmits a supervisory signal (confirmation message) to billing system 55 indicating that a call associated with a particular subscriber identification information has been completed. The timer expires when billing system 55 receives a release signal from MSC 52 indicating that a call associated with a particular subscriber identification information has ended. MSC 52 also transmits a "call hold" signal to billing system 55 when a loss of carrier condition is detected by a cell site and communicated to MSC 52. Upon receiving the call hold signal, the processor of billing system 55 suspends its minutes of usage recording operations. Those operations are resumed only when a "call resume" message is received from MSC 52. If after a predetermined period of time, no "call resume" message is received from MSC 52, billing system 55 stops the timer and logs its MOU recording into a billing file associated with the subscriber identification number.

The operation of wireless network 104 and the interactions of the elements of wireless network 104 are better understood when described in conjunction with a call flow for a connection between, for example, carphone 20 and wired telephone 80. When the connection is established, MSC 52 sends a signal to billing system 55 to start the timer for minute of usage recording for the call. The connection includes a wireless segment that extends from carphone 20 to cell site 36, for example, and a wired segment that spans from cell site 36 to wired telephone set 80. When cell site 36, as part of its function of monitoring continuity signals on the wireless segment of the connection (described above), detects, in step 201, a loss of carrier condition on the wireless segment of the connection, cell site 36, in step 202, transmits an alert signal to MSC 52 of cellular switch 50. Upon receiving the alert signal, MSC 52, in step 203, sends a "call hold" message to billing system 55 to suspend its minute of usage recording operation. MSC 52 proceeds in step 204, to couple to voice response unit 53, via facility 56, to the switched connection 71 (indicated in FIG. 1 by the dashed line) that extends from telephone set 80 to cellular switch 50, thereby establishing a voice path which connects voice response unit 53 to the user of wired telephone set 80. Voice response unit 53, in step 205, delivers an announcement to the user of telephone set to inform the user of the loss of carrier condition. The announcement also invites the user to be placed on hold while the wireless segment of the link is being restored. Upon receiving agreement from the user, in step 206, MSC 52 places the call on hold while cell site 36 and adjacent cell site 37 page carphone 20 to establish a new wireless link. A determination is then made in step 207 as to whether the restoration of the wireless segment was successful. The success of the restoration of the wireless segment is predicated on the reception of a page response message by cell site 36, for example, from carphone 20. In response to receiving the page response message from carphone 20, cell site 36 sends a call setup message to MSC 52 with a list of potential radio channels that may be able to handle the call. Upon receiving the call setup message, MSC 52, in step 208, selects a radio channel, drops link 56 and bridges the selected radio channel to link 71 thereby re-establishing an end-to-end connection from carphone 20 to wired telephone set 80. Subsequently, MSC 52, in step 209, transmits a "call resume" message to billing system 55 to resume recording MOU for the call.

When after a predetermined time period, no page response message is received from carphone 20 by cell site 36 or adjacent cell site 37, voice response unit 53, in step 210, delivers a message to the user of telephone set 80 to invite that user to be called back within a given time interval. If restoration of the wireless segment is successful within that time interval, as determined in step 211, MSC 52, in step 212, connects the restored wireless segment to voice response unit 53 which delivers a message to the user of the carphone 20. The message informs the user that the connection to telephone set 80 is in the process of being reestablished. In step 213, MSC 52 uses links 56 and 71 to allow voice response unit 53, to deliver, in step 214, a similar message to the user of wired telephone set 80. In step 215, MSC 52 couples the restored wireless segment to link 71, thereby re-establishing an end-to-end connection from carphone 20 to wired telephone set 80.

Upon re-establishing the end-to-end connection, MSC 52, in step 216, sends a "call resume" message to billing system 55 which proceeds to resume collection of MOU for the call. The MOU collection process continues until MSC 52, in step 217, receives a call disconnect signal from either land-line network 60 or cell site 36. Upon receiving the disconnect signal, MSC 52, transmits a "call release" message, in step 218, to billing system 55 to end the MOU collection process for the call. In step, 219, MSC 52 terminates the call by propagating the disconnect signal throughout the network.

The foregoing is to be construed as only being an illustrative embodiment of this invention. Persons skilled in the art can easily conceive of alternative arrangements providing functionality similar to this embodiment without any deviation from the fundamental principles or the scope of this invention.

I claim:

1. A method of providing voice communications services to users, the method comprising:

establishing an initial end-to-end communications link comprising:

a) an initial first segment which carries wireless communications signals and which connects a wireless network to a wireless end-user apparatus, and b) a second segment which connects a communications end-user device to said wireless network;

in response to detecting a signal indicating that the initial first segment of the link has been disconnected, inhibiting release of the second segment;

setting up a subsequent first segment extending from said wireless network to said wireless end-user apparatus;

establishing a new end-to-end communications link comprising: of the second segment and said subsequent first segment; and adjusting an amount of time recorded for usage of the voice communication services to compensate for delays in establishing the new end-to-end communication link.

2. The method of claim 1 wherein said inhibiting step includes:

notifying a user of the communications end-user device of an inoperative condition of said initial first segment.

3. The method of claim 1 wherein said inhibiting step comprises:

connecting the second segment to a voice response unit; and delivering an announcement to a user of the communications end-user device to invite that user to refrain from releasing the second segment.

4. The method of claim 1 or 3 further comprising:

bridging the second segment to the subsequent first segment in response to a signal from the wireless end-user apparatus indicative of readiness for the wireless end-user apparatus to receive communications signals.

5. The method of claim 1 wherein said second segment also carries wireless communications signals.

6. The method of claim 1 further including:

monitoring supervisory audio tones superimposed on said wireless communications signals carried on said initial first segment to and from said wireless end-user apparatus; and ascertaining within said wireless network that said initial first segment of said first end-to-end communication link is inoperative when at least one reply to said supervisory audio tones is not received within a predetermined time period.

7. The method of claim 1 further:

tearing down said initial first segment before establishing said new end-to-end communications link.

8. The method of claim 1 wherein said subsequent first segment is connected to a cell site from which said initial first segment was disconnected.

9. The method of claim 1 wherein said subsequent first segment is connected to a cell site which is different from the cell site to which said initial first segment was connected.

10. A method of completing a call over a wireless communications network comprising:

establishing a connection between a first communicating party and a second communicating party, the connection including:

a) a first segment extending from the first party's end-user device to the wireless communications network, and b) a second segment which carries wireless communication signals and which extends from the wireless communications network to a wireless end-user apparatus serving the second party;

detecting a loss of carrier signal on the second segment of the connection;

delivering an announcement to the first party informing the first party of the loss of carrier signal and inviting the first party to keep the first segment operative;

re-establishing the second segment to the second party; bridging the first segment to the re-established second segment to re-establish the connection between the first and second parties; and adjusting an amount of time recorded for usage of the wireless communication services to compensate for delays in re-establishing the second segment to the second party.

11. The method of claim 10 wherein said first segment is a wireless link which carries wireless communications signals, and said end-user device is a wireless end-user device.

12. The method of claim 10 wherein said detecting step comprises:
transmitting supervisory messages from said wireless communications network to said wireless end-user apparatus; and
in response to a failure of the wireless end-user apparatus to respond within a predetermined time period to the supervisory messages after repeated transmissions of said supervisory messages, releasing said second segment.

13. In a communications network, a method of providing wireless communications service to at least one wireless user comprising:
establishing a connection from the at least one wireless user to a communications service user, the connection including a first section and a wireless section;
detecting a loss of carrier signal on the wireless section of the connection;
inhibiting release of the first section of the connection;
attempting to restore the wireless section of the connection, the attempt to restore continuing until a timer expires; and
in response to signals indicating that repeated attempts to restore were unsuccessful:
informing the communications service user of the loss of carrier signal and collecting information including a telephone number at which the communications service user can be contacted by the at least one wireless user within a predetermined time interval,
releasing the first section of the connection,
establishing a first communications path extending from the communications network to the at least one wireless user within said time interval,
establishing a second communications path extending from the communications network to the communications service user using said telephone number, and
bridging the first communications path and the second communications path to re-establish communications between the at least one wireless user and the communications service user.

14. A wireless communications system comprising:
a transceiver which detects a signal indicative of a loss of carrier signal on a first link which carries wireless communications signals to and from a wireless user, said first link being part of an end-to-end communications path which includes a second link serving a communications service user with whom said wireless user was communicating prior to said loss of carrier signal;
means responsive to said detection of loss of carrier signal for restraining release of said second link;
means for establishing a third link capable of carrying wireless communications signals to and from said wireless user;
means for bridging said third link to said second link to re-establish an end-to-end communications path between said wireless user and said communications service user; and
means for adjusting an amount of time recorded for usage of said end-to-end communications path to compensate for delays associated with:
a) establishing said third link, and
b) bridging said third link to said second link.

15. The apparatus of claim 14 wherein said restraining means comprise:
means for delivering an announcement to said communications service user to inform said communications service user of said loss of carrier signal and to advise said communications service user to keep said second link operative pending said re-establishment of said end-to-end communications path.

16. A method of collecting billing data for a telephone call, said method comprising:
responsive to signals indicating that an end-to-end connection is established between a wireless end-user apparatus and a communication end-user device, recording charges for usage of said end-to-end connection which includes i) a wireless segment coupled to said wireless end-user apparatus and ii) another segment coupled to said communications end-user device;
in response to signals indicative of a loss of carrier signal condition on the wireless segment of the connection, stopping recording of said charges without releasing the other segment of the connection;
resuming recording of charges for usage of said connection from the time following a) restoration of said wireless segment, and b) re-establishment of an end-to-end connection between said wireless end-user apparatus and said communications end-user device; and
in response to signals indicative of termination of the call, stopping recording of said charges for usage of said end-to-end connection.

17. A system of providing voice communications services to users, the system comprising:
means for establishing an initial end-to-end communications link comprising:
a) an initial first segment which carries wireless communications signals and which connects a wireless network to a wireless end-user apparatus, and
b) a second segment which extends from a communications end-user device to said wireless network;
means responsive to detection of a signal indicating that said first segment of the link has been disconnected, for inhibiting release of said second segment;
means for setting up a subsequent first segment from said wireless network to said wireless end-user apparatus;
means for establishing a new end-to-end communications link comprised of the second segment and said subsequent first segment; and
means for adjusting an amount of time recorded for usage of said voice communication service to compensate for delays in establishing the new end-to-end communications link.

18. The system of claim 17 wherein said inhibiting means includes:
means for notifying a user of the communications end-user device that said initial first segment has been disconnected.

19. The system of claim 17 wherein said inhibiting means further includes:
means for connecting the second segment of the initial end-to-end communications link to a voice response unit; and
means for delivering an announcement to a user of the communications end-user device to invite that user to refrain from releasing the second segment.

20. The system of claim 17 or 19 wherein said means for establishing a new end-to-end communications link includes:

means responsive to a signal from the wireless end-user apparatus indicative of readiness for the wireless end-user apparatus to receive communications signals for bridging the second segment to the subsequent first segment.

21. The system of claim 17 wherein said second segment of the initial end-to-end communications link also carries wireless communications signals.

22. The system of claim 17 further including:

means for monitoring supervisory audio tones superimposed on said wireless communications signals carried on said initial first segment to and from said wireless end-user apparatus;

means for ascertaining within said wireless network that said initial first segment is inoperative when at least one reply to said supervisory audio tones is not received within a predetermined time period.

23. In a communications network, a system of providing wireless communications services to at least one wireless user, the system comprising:

means for establishing a connection from the at least one wireless user to a communications service user, the connection including a first section and a wireless section;

means for detecting a loss of carrier signal on the wireless section of the connection;

means for inhibiting release of the first section of the connection;

means for attempting to restore the wireless section of the connection, the attempt to restore continuing until a timer expires;

means, responsive to signals indicating that repeated attempts to restore were unsuccessful, for informing the communications service user of the loss of carrier signal and for collecting information including a telephone number at which the communications service user can be contacted by the at least one wireless user within a predetermined time interval, the means for inhibiting release of the first section releasing the first section after collecting the information;

means for establishing a first communications path extending from the communications network to the at least one wireless user within said time interval;

means for establishing a second communications path using said addressing information, the second communications path extending from said communications network to the communications service user; and means for bridging the first communications path and the second communications path to re-establish communication between the at least one wireless user and the communications service user.

* * * * *